No. 833,272. PATENTED OCT. 16, 1906.
A. WEYMAR.
MECHANICAL MOVEMENT.
APPLICATION FILED APR. 26, 1906.

Witnesses:

Inventor
Adolph Weymar
by ........ Atty.

UNITED STATES PATENT OFFICE.

ADOLPH WEYMAR, OF NEW YORK, N. Y.

MECHANICAL MOVEMENT.

No. 833,272.     Specification of Letters Patent.     Patented Oct. 16, 1906.

Application filed April 26, 1906. Serial No. 313,730.

*To all whom it may concern:*

Be it known that I, ADOLPH WEYMAR, a citizen of the United States, residing at New York city, Brooklyn, county of Kings, State of New York, have invented new and useful Improvements in Mechanical Movements, of which the following is a specification.

This invention relates to a mechanical movement more particularly designed for marine and land propulsion, though it may also be used for other purposes.

Figure 1:
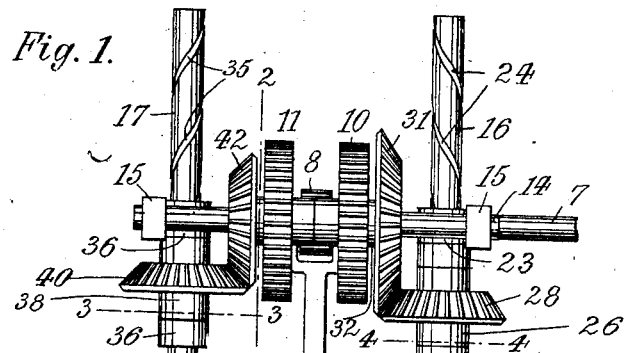
Figure 3:
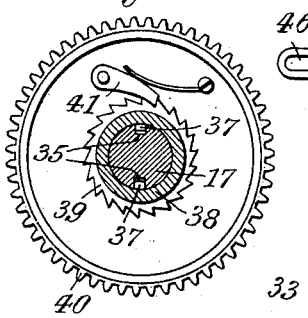
Figure 2:
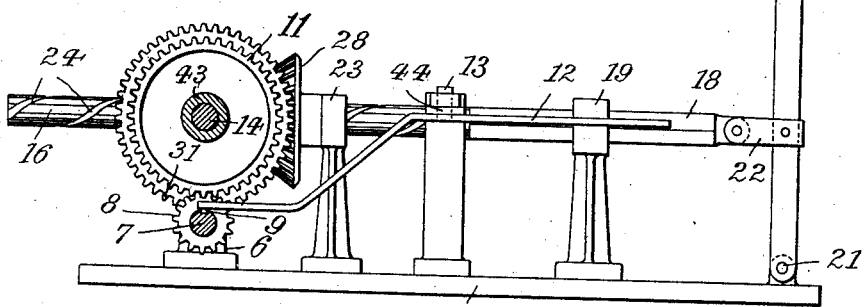

In the accompanying drawings, Figure 1 is a plan of a mechanical movement embodying my invention; Fig. 2, a section on line 2 2, Fig. 1; Fig. 3, an enlarged cross-section on line 3 3, Fig. 1; and Fig. 4, a similar section on line 4 4, Fig. 1.

Figure 4:
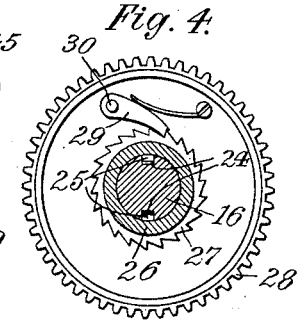

From a base-plate 5 project the bearings 6 of the work-shaft 7, to which forward or backward rotatory motion is to be imparted. Shaft 7 carries a slidable pinion 8, operatively connected thereto by a groove and feather 9. Pinion 8 may be intergeared with either one of a pair of toothed wheels 10 11 by means of a reversing-lever 12, turning on fulcrum 13. Wheels 10 and 11 are loosely mounted upon a fixed shaft 14, supported in bearings 15. These wheels are rotatable in opposite directions to impart either a forward or a backward movement to shaft 7 in the following manner:

At each side of reversing-lever 12 is arranged one of a pair of parallel spindles 16 17, that extend at right angles to shaft 7. Spindle 16 has a square forward section 18, engaging a correspondingly-squared guide 19. A hand-lever 20, fulcrumed to base 5 at 21 and connected to spindle 16 by link 22, serves to impart rectilinear reciprocating movement to the spindle. The rear cylindrical section of the latter is guided in bearings 23 and is provided with a pair of diametrically-opposed parallel spiral threads 24. These threads are engaged by a pair of pins 25, projecting inwardly from the hub 26 of a ratchet-wheel 27, rotatably mounted on spindle 16. Upon the latter is further rotatably mounted a beveled wheel 28, arranged in proximity to wheel 27 and adapted to be taken along by the latter in one direction only by a spring-pawl 29. This pawl is pivoted to wheel 28 at 30 and engages the teeth of ratchet-wheel 27, as shown in Fig. 4. Wheel 28 intergears with a beveled wheel 31, turning on shaft 14 and connected to wheel 10 by means of a common hub 32. The construction of spindle 17 is in all respects similar to that of spindle 16, the only exception being that it is not provided with a hand-lever. Spindle 17 has the squared front section 33 and angular guide 34, while its cylindrical rear section is provided with a double thread 35 and slides in bearings 36. Threads 35 are engaged by pins 37, projecting inwardly from the hub 38 of a ratchet-wheel 39, adapted to be operatively coupled to a beveled wheel 40 by pawl 41. Wheel 40 intergears with beveled wheel 42, fast on the hub 43 of wheel 11.

Means are provided for transmitting from spindle 16 a reciprocating movement in the opposite direction to spindle 17. These means consist of a two-arm lever 44, turning on fulcrum 13 and having slotted ends 45 46. Of these, slot 45 is engaged by a stud 47 on spindle 16, while slot 46 is engaged by a stud 48 on spindle 17.

When shaft 7 is to be driven forward, lever 12 is turned to intergear wheel 8 with wheel 10, and thereby couple shaft 7 to the latter. Reciprocating movement being imparted to spindle 16 by hand-lever 20, the forward movement of the spindle will cause wheel 27 to turn to the right by threads 24 and pins 25. This movement is, however, not transmitted to wheel 28, as wheel 27 will not become operatively engaged by pawl 29. Upon the back stroke of spindle 16 wheel 27 is turned to the left and will now impart a corresponding movement to wheel 28 by pawl 29. Wheel 28 in turn rotates shaft 7 in the manner desired by wheels 31, 10, and 8.

During the reciprocating movement of spindle 16 spindle 17 will be reciprocated in an opposite direction by lever 44 and studs 47 48. In this way wheel 42, and consequently wheel 11, will be turned in a direction opposite to that of wheels 31 and 10.

If the motion of shaft 7 is to be reversed, lever 12 is turned to couple said shaft by pinion 8 to wheel 11. Consequently shaft 7 will be rotated backward by spindle 17, through wheels 40, 42, and 11, while spindle 16 will run idle.

It will be seen that in my mechanical movement all objectionable crank mechanism is dispensed with and that it permits a ready manipulation and reversal of the driving-gear.

What I claim is—

1. A mechanical movement comprising a pair of parallel threaded spindles, means for guiding said spindles in a rectilinear direction, hubs operatively engaging the spindles, a work-shaft, and means for operatively connecting said shaft to either of the hubs, substantially as specified.

2. A mechanical movement comprising a pair of parallel threaded spindles, means for guiding said spindles in a rectilinear direction, means for reciprocating one of said spindles, a two-arm lever connecting said spindle with the other spindle, hubs operatively engaging the spindles, a work-shaft, and means for operatively connecting said shaft to either of the hubs, substantially as specified.

3. A mechanical movement comprising a pair of parallel threaded spindles, means for guiding said spindles in a rectilinear direction, hubs having pins that engage the spindle-threads, ratchet-wheels on the hubs, a pair of bevel-gears having pawls adapted to engage the ratchet-wheels, a pair of gear-wheels connected to the bevel-gears, a work-shaft, means for coupling said shaft to either of the gear-wheels, and means for operatively connecting the spindles, substantially as specified.

Signed by me at New York city, Manhattan, New York, this 25th day of April, 1906.

ADOLPH WEYMAR.

Witnesses:
  WILLIAM SCHULZ,
  FRANK V. BRIESEN.